United States Patent [19]

Kanamaru et al.

[11] 4,339,873
[45] Jul. 20, 1982

[54] METHOD OF MAKING ROTOR OF ROTARY MACHINES

[75] Inventors: Hisanobu Kanamaru, Ibaraki; Moisei Okabe, Tokyo; Hideo Tatsumi, Ibaraki; Akira Tohkairin, Ibaraki; Ryoji Kasama, Ibaraki, all of Japan

[73] Assignee: Hitachi, Ltd., Tokyo, Japan

[21] Appl. No.: 125,094

[22] Filed: Feb. 27, 1980

[30] Foreign Application Priority Data

Mar. 5, 1979 [JP] Japan ................................ 54-24492

[51] Int. Cl.$^3$ .............................................. H02K 15/02
[52] U.S. Cl. ......................................... 29/598; 29/520; 310/42
[58] Field of Search ............... 29/520, 598; 310/42, 310/261

[56] References Cited

U.S. PATENT DOCUMENTS

| | | | |
|---|---|---|---|
| 1,067,362 | 7/1913 | Miller, Jr. | 29/520 |
| 2,517,598 | 8/1950 | Rehnberg et al. | 29/520 |
| 3,000,420 | 9/1961 | Spokes | 29/520 |
| 3,355,801 | 12/1967 | Priddy | 29/598 |
| 3,650,022 | 3/1972 | Stone | 29/598 |

*Primary Examiner*—Carl E. Hall
*Attorney, Agent, or Firm*—Craig and Antonelli

[57] ABSTRACT

A rotor of a rotary machine, having a core member consisting of a plurality of hollow pieces, and a rotary shaft which is inserted and secured in a hollow portion of said core member, wherein annular grooves having ruggid bottom are formed in said rotary shaft at positions slightly inside the end surfaces of said core member, and portions of said core member are inserted in said grooves so that said rotary shaft and said core member are fastened together.

7 Claims, 20 Drawing Figures

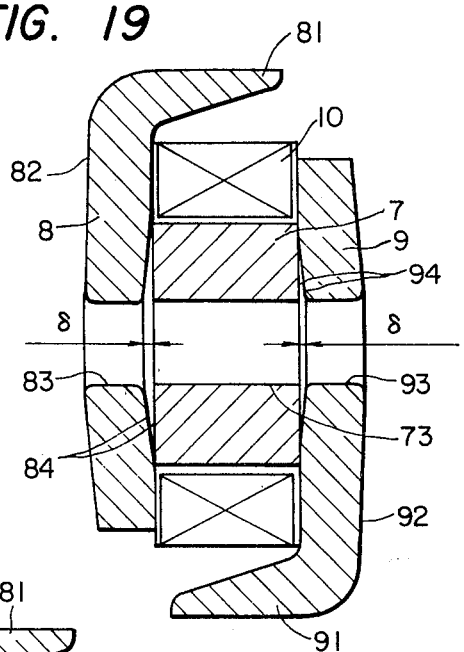
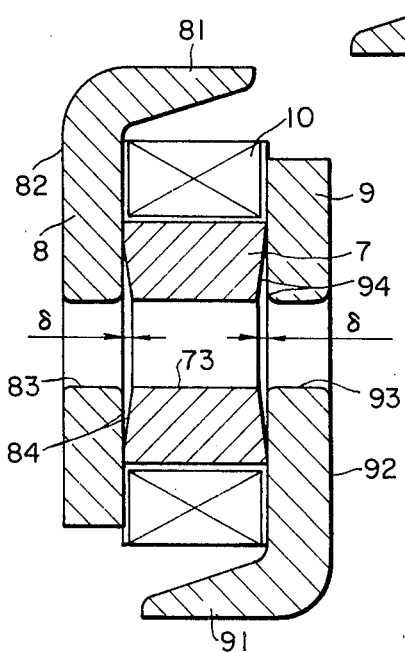

METHOD OF MAKING ROTOR OF ROTARY MACHINES

BACKGROUND OF THE INVENTION

The present invention relates to a rotor of rotary machines and to a method of making the same, and more specifically to a rotor in which a core member is composed of a plurality of hollow members so as to be suited for rotary machines such as a-c generators of automobiles and to a method of making the same.

Conventional technique for fastening a rotary shaft to a core member which constitutes a rotor of a rotary machine has heretofore been relying upon a method of forcibly inserting the core member into the knurled rotary shaft to ensure very large fastening force. According to the above method, however, a great force of an axial direction is exerted on the rotary shaft when it is being inserted; the rotary shaft tends to be bent. The rotary shaft which is bent causes the life of the rotary machines to be shortened or produces noise.

Besides, the core member is not often sufficiently fitted to the knurled portion and fails to ensure great mechanically coupled force (rotational torque).

Furthermore, shear bursting force is small with respect to the stress in the axial direction.

Another fastening method consists of knurling the rotary shaft like the above-mentioned method, forming an annular groove in the rotary shaft at a position corresponding to an end surface of the rotor core, forcibly introducing the rotor core and yoke into the rotary shaft, and coining the end portion of the rotor core so that they are prevented from being removed in the axial direction. With this method, the force against the stress in the axial direction can be improved to some extent, which, however, is not still sufficient.

SUMMARY OF THE INVENTION

The object of the present invention is to provide a fastening construction and a fastening method by which the core member of a rotary machine can be fastened to a rotary shaft, without causing the rotary shaft to be bent yet maintaining increased mechanical coupling force (in the rotating direction and in the axial direction).

The feature of the present invention consists of forming annular grooves in a rotary shaft at positions slightly on the inner side of the end surfaces of a core member, forming rugged portions in the grooves, inserting the rotary shaft into a hollow portion in the core member, and fitting portions of the core member into the grooves, so that a force for coupling the rotary shaft and the core member together is established by the fitted portion.

BRIEF DESCRIPTION OF THE DRAWING

FIGS. 6 and 7 illustrate an example of a coupling method of the present invention, wherein FIG. 6 shows the state in which the rotor is placed in the metal mold and is subjected to the preload, and FIG. 7 shows a step of coupling;

FIGS. 19 and 20 are diagrams for assembling core members according to coupling methods of still further embodiments of the present invention.

DETAILED DESCRIPTION OF PREFERRED EMBODIMENTS

Embodiments of the present invention are mentioned below in conjunction with the drawings.

Figure 1:
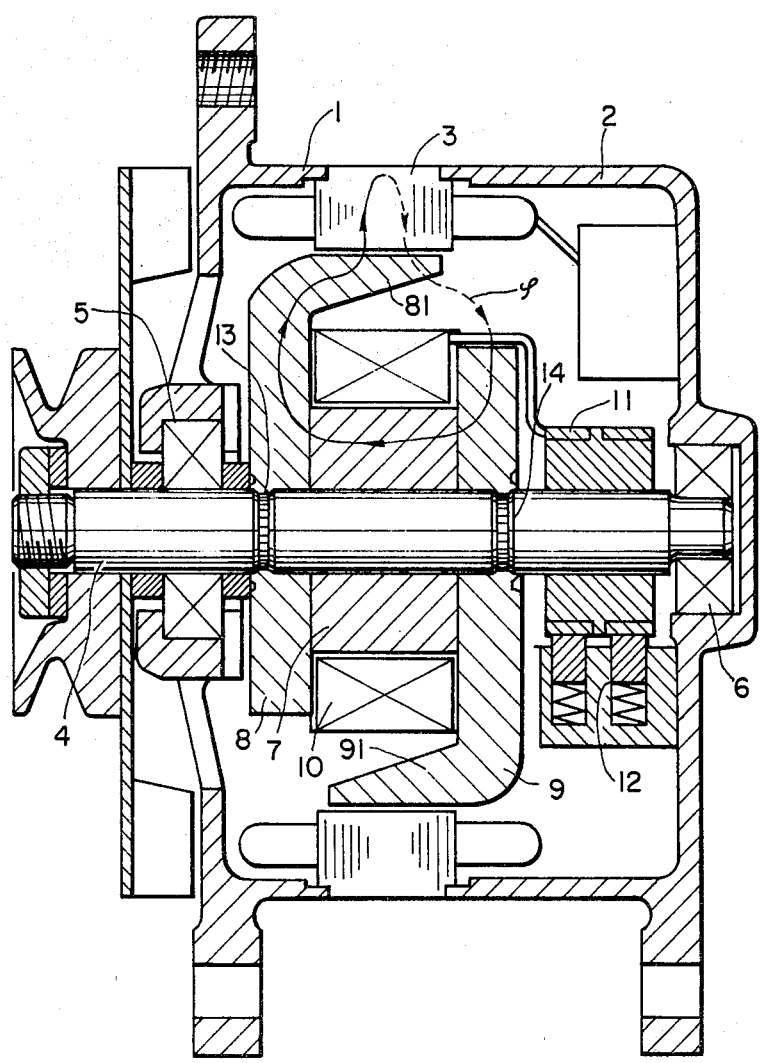
FIG. 1 is a cross-sectional view of an a-c generator according to an embodiment of the present invention.

FIG. 1 is a cross-sectional view of a rotary field-type a-c generator according to an embodiment of the present invention, which is used for automobiles.

In FIG. 1, reference numerals 1 and 2 denote a pair of housings between which a stator core 3 is supported. Reference numeral 4 denotes a rotary shaft which is supported by the housings 1 and 2 through bearings 5 and 6. To the rotary shaft 4 have been secured a hollow yoke 7 and rotor cores 8 and 9, which constitute a core member. On the peripheral portions of the rotor cores 8 and 9 have been formed pawls 81, 91 in a manner to bite into each other. Rotor cores 8, 9 should be made of a material having a deformation resistance which is smaller than that of the material of the rotary shaft 4. In this embodiment, the rotary shaft 4 is made of S45C, and both the rotor cores and the yoke are made of a low-carbon steel. A field winding 10 is wound on the yoke 7, and is served with electric power from an external power supply via slip rings 11 and brushes 12. Symbol 4 denotes a magnetic flux.

Figure 2:
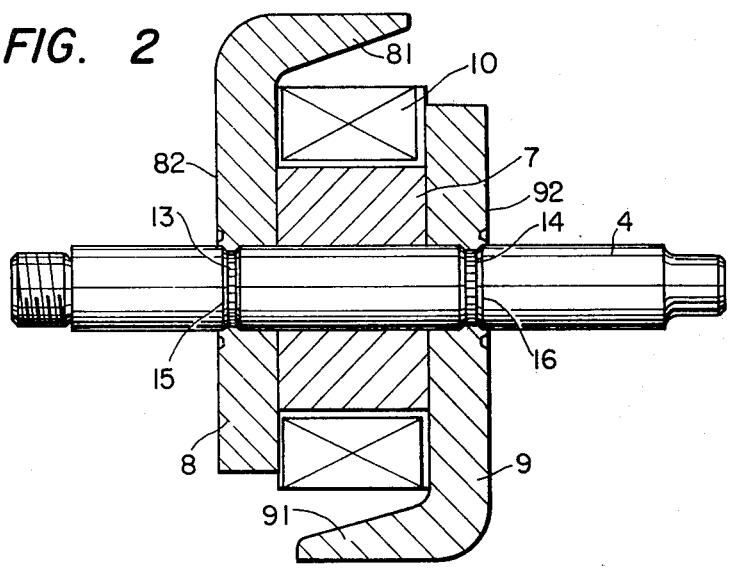
FIG. 2 is a cross-sectional view illustrating, in detail, the rotor of FIG. 1.

Referring to FIG. 2, grooves 13 and 14 are formed in the rotary shaft 4 at positions close to end surfaces 82, 92 of the rotor cores 8 and 9. Knurls 15, 16 are formed on the bottoms of the grooves to create rugged portions. The rugged portions may be formed by a method other than the knurling, provided rugged surfaces are formed along the circumferential direction of the rotary shaft.

Figure 3:
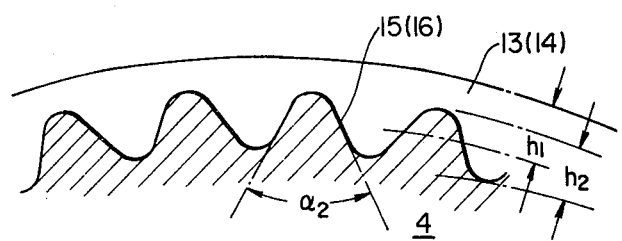
FIG. 3 is a view illustrating a groove and knurling formed in the rotary shaft of FIG. 2.

With reference to FIG. 3, an average depth $h_1$ of grooves and a height $h_2$ of knurling should lie from 0.1 to 1.0 mm, preferably from 0.2 to 0.8 mm. Further, an angle of inclination $a_1$ at the end of the groove (FIG. 4) and an angle of inclination $a_2/2$ of knurling should both lie from about 25° to about 70°.

A diameter $D_1$ (FIG. 4) of the rotary shaft 4 should be equal to, or slightly smaller than, diameters $D_2$, $D_3$ of hollow portions 73, 83, 93 of the yoke 7 and rotor cores 8, 9. Preferably, they should be fitted together maintaining a clearance. Depending upon the materials and applications, they may be fitted together maintaining the freedom of sliding. The rotary shaft, however, should be allowed to be inserted into the hollow portions without requiring too great force, as the too great force may cause the rotary shaft 4 to be bent.

When the distance from the bottom of a recessed portion 19 of the end surface 82 of the rotor core to the groove 13 is denoted by s, and the width from the circumference of the rotary shaft 4 to the outer circumferential end of the recessed portion 19 is denoted by b (FIG. 4), there exists a preferable range for s/b. FIG. 5 shows experimentally found results of a relation among s/b, rotational torque, and shear bursting force in the axial direction ($D_1 = D_2 = D_3 = 17$ mm, b=2.5 mm, groove width T=3.0 mm, $h_1 = 0.35$ mm, $a_1 = 45°$, thickness of rotor core=10 mm). As s/b increases, the flow of a portion of the rotor cores involves great frictional losses during the plastic processing, making it difficult to sufficiently fit portions of the rotor cores into the grooves. Therefore, great shearing force is not obtained in the axial direction. Conversely, when the bottom of the recessed portion 19 comes inside the end of the grooves 13, 14, i.e., when the distance s acquires a negative value, it becomes difficult to fit portions of the rotor cores into the grooves; great rotational torque and shearing force in the axial direction are not obtained. From the practical point of view, s/b should lie from 0 to $\frac{3}{4}$. For example, with reference to the generator shown in FIG. 1, when the width b is from 2 to 3 mm, the distance s should lie from 0 to 2 mm.

Figure 6:
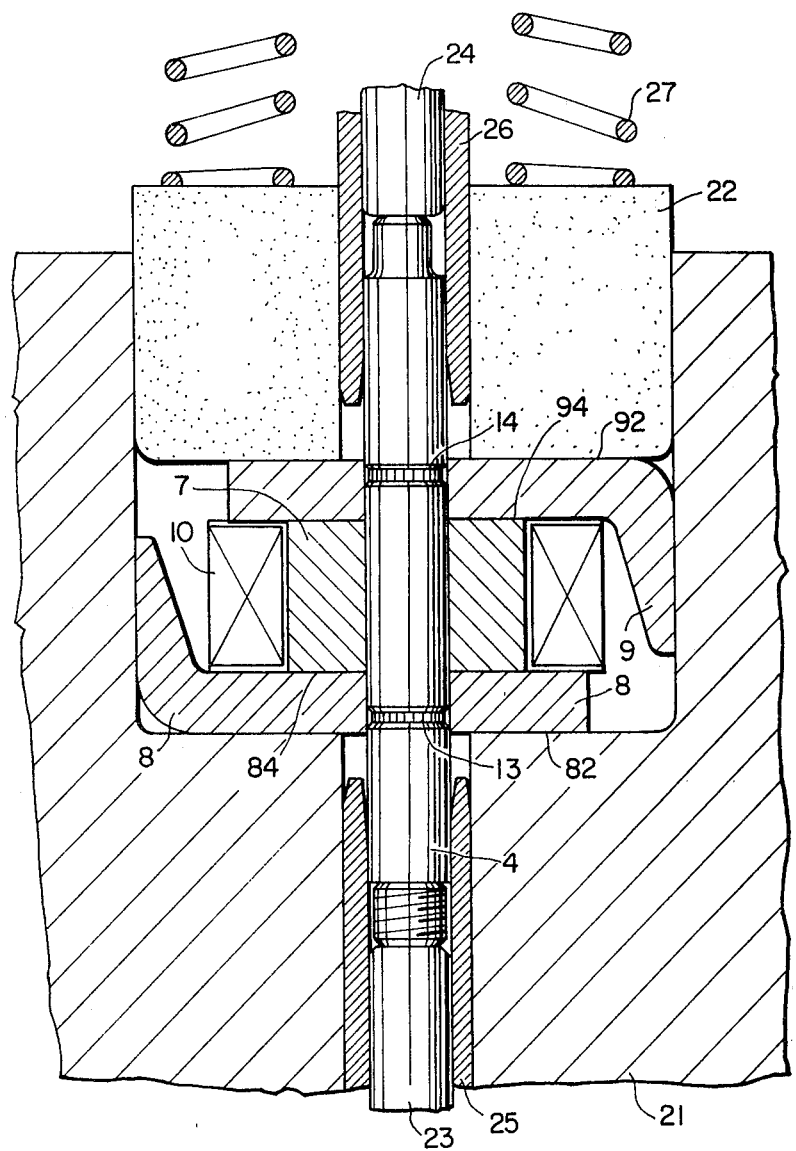
Figure 7:
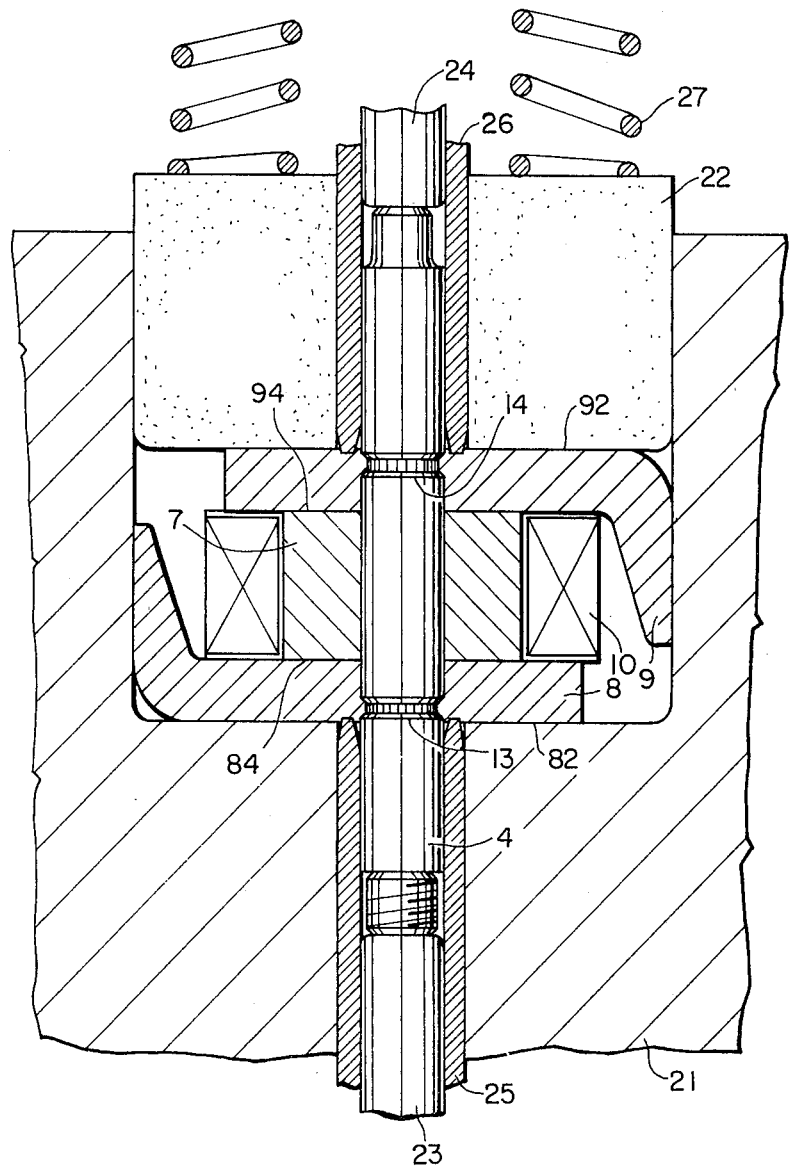

FIGS. 6 and 7 show an example of a coupling step according to the present invention.

Reference numeral 21 represents a receiving mold, 22 represents a holder mold, 25 represents a mold tool which pushes from the lower side, and 26 represents a mold tool which pushes from the upper side.

In effecting the coupling, the rotary shaft 4 is first inserted into a hollow portion of the core member (consisting of yoke 7, and rotor cores 8 and 9).

Then, the rotor core 8 is supported by the receiving mold 21, while a preload is exerted by a spring 27 on the rotor core 9. Hence, contacting surfaces 84, 94 among the rotor cores 8, 9, and yoke 7 are intimately adhered together. Magnitude of the preload should be so selected that a prestress $\sigma_0$ which is nearly equal to, or slightly smaller than, a deformation resistance $\sigma_1$ of the material of rotor cores is generated in the rotor cores 8, 9. For instance, when the yoke 7 has an inner diameter of 17 mm and an outer diameter of 42 mm, the preload should be selected to be from about 20 tons to 30 tons.

The rotary shaft 4, on the other hand, is supported between support shafts 23 and 24 so that grooves 13, 14 establish a predetermined relation in position with respect to the rotor cores 8, 9.

Under this state, the end surface 82 of the rotor core 8 is pressed from the lower direction by the mold 25 so that there will develop deformation stress $\sigma_2$ which is greater than deformation resistance $\sigma_1$ of the rotor core 8. Namely, the rotor core 8 is caused to practically flow so that a portion thereof flows into the groove 13; the rotor core 8 and the rotary shaft 4 are thus coupled together. The processing will be carried out under cold condition.

With the preload being exerted, both the rotor core and hollow portions 73, 83, 93 of the yoke stretch to some extent toward the inner side in the radial direction. Therefore, even when they are assembled together maintaining clearance, the rotary shaft, rotor core and yoke are fitted together eliminating the clearance after the operation of coupling has been finished, contributing to the increase in the coupling strength (rotational torque).

When the inner and outer diameters of the yoke are 17 mm and 42 mm, respectively, the pressing force of about 20 tons will be needed to effect the coupling by plastic deformation.

Prestress $\sigma_0$ has been acting upon the rotor core 8. When pressed from the lower direction by the mold 25, therefore, the rotor core 8 is prevented from being wholly stretched toward the outer side in the radial direction; stress $\sigma_2$ is locally increased only in the vicinity of the groove. Accordingly, a portion of the rotor core 8 can be caused to effectively flow into the whole groove.

Then, in the same manner as mentioned above, the end surface 92 of the rotor core 9 is pressed by the mold 26 from the upper direction, so that the rotor core 8 is prevented from being wholly stretched toward the outer side in the radial direction; stress $\sigma_2$ is locally increased only in the vicinity of the groove. Accordingly, a portion of the rotor core 8 can be caused to effectively flow into the whole groove.

Then, in the same manner as mentioned above, the end surface 92 of the rotor core 9 is pressed by the mold 26 from the upper direction, so that the rotor core 9 and the rotary shaft 4 are coupled together.

According to the aforementioned coupling method of the embodiment of the present invention, almost no force is exerted in the axial direction of the rotary shaft when the rotary shaft is being inserted in the hollow portions of yoke and rotor cores. With the conventional forcibly introducing method with knurling, the pressing force of from 3.3 tons to 5 tons was necessary in the case of producing generators for automobiles. With the method of the present invention, however, the pressing force can be reduced to 100 kg or smaller. Consequently, the rotary shaft is very scarcely bent.

Figure 8:
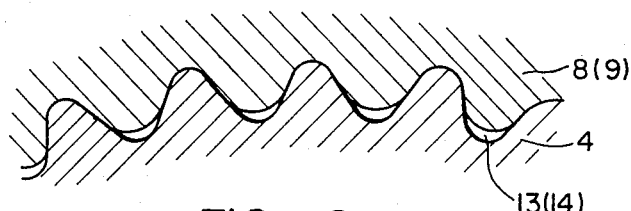
FIG. 8 is a diagram showing the groove after the coupling has been accomplished by the method of the present invention.

FIG. 8 illustrates in cross section the details of a coupling portion attained by the coupling method according to the embodiment of the present invention. It will be understood that portions of the rotor cores 8, 9 have been caused to deeply flow into the knurled portions in the grooves 13, 14.

Figure 9:
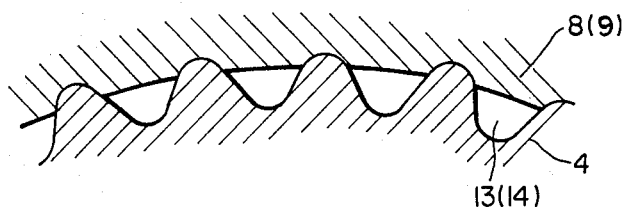
FIG. 9 is a diagram showing the knurling portion after the coupling has been accomplished by a conventional method of FIG. 10.
Figure 10:
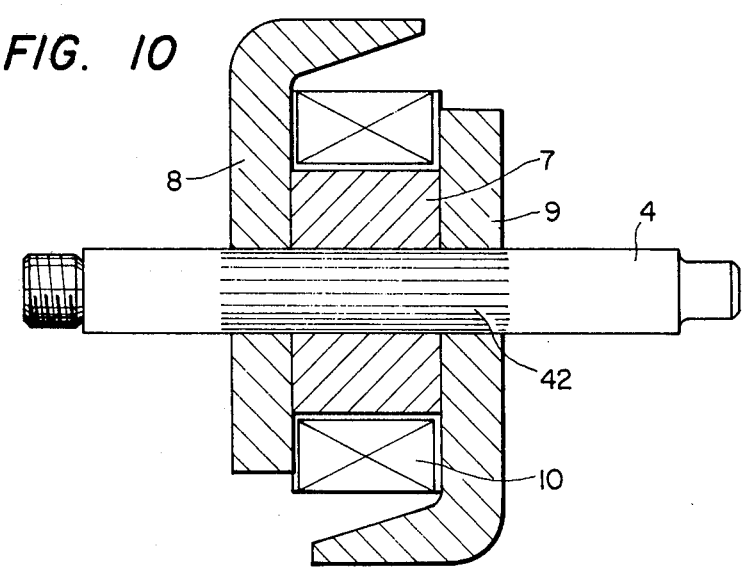
FIG. 10 is a cross-sectional view showing a rotor assembled by a conventional coupling method.

On the other hand, FIG. 9 shows a conventional method of FIG. 10, i.e., shows in cross section a coupling portion when the periphery of the rotary shaft 4 is knurled as denoted by 42, and the rotary shaft is forcibly introduced into hollow portions of the rotor cores 8, 9, and yoke 7. The rotor core (or yoke) bites less into the knurled portion; reduced shearing area contributes to the rotational torque.

Figure 11:
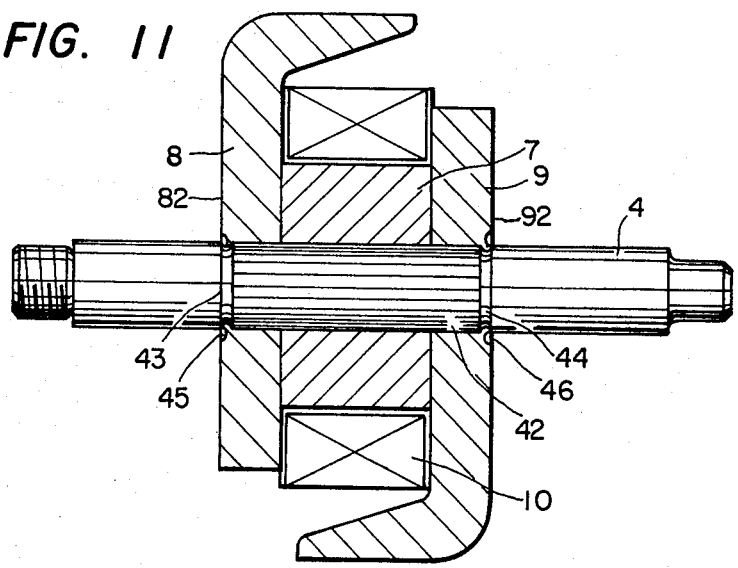
FIG. 11 is a cross-sectional view of a rotor assembled by another conventional coupling method.

According to another conventional method shown in FIG. 11 in which, in addition to the method of FIG. 10, annular grooves 43, 44 are formed in the rotary shaft 4 at positions corresponding to end portions 82, 92 of the rotor cores 8, 9, and portions of the rotor cores 8, 9 are coined as denoted by 45, 46, the rotor core or yoke is allowed to bite little into the knurled portion as shown in FIG. 9.

Figure 12:
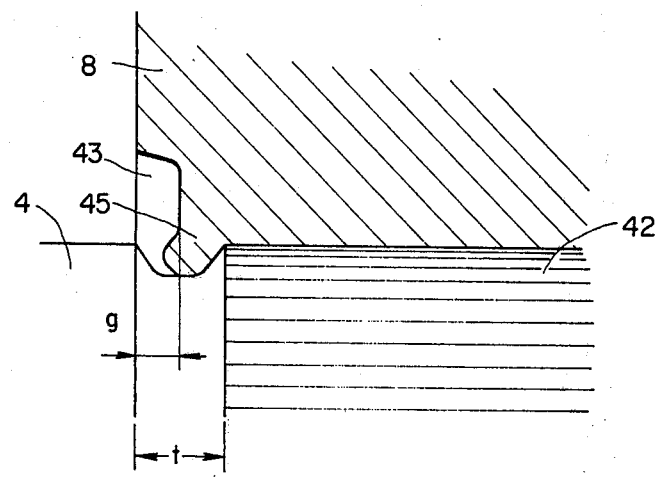
FIG. 12 is a diagram illustrating the details of the coupling portion by the coupling method of FIG. 11.

The coining is effected in order to increase the shear bursting force against the stress in the axial direction. As shown in FIG. 12, however, a gap g (about one-half the groove width t) is formed in the grooves 43, 44, so that sufficient shear bursting force is not produced.

Figure 4:
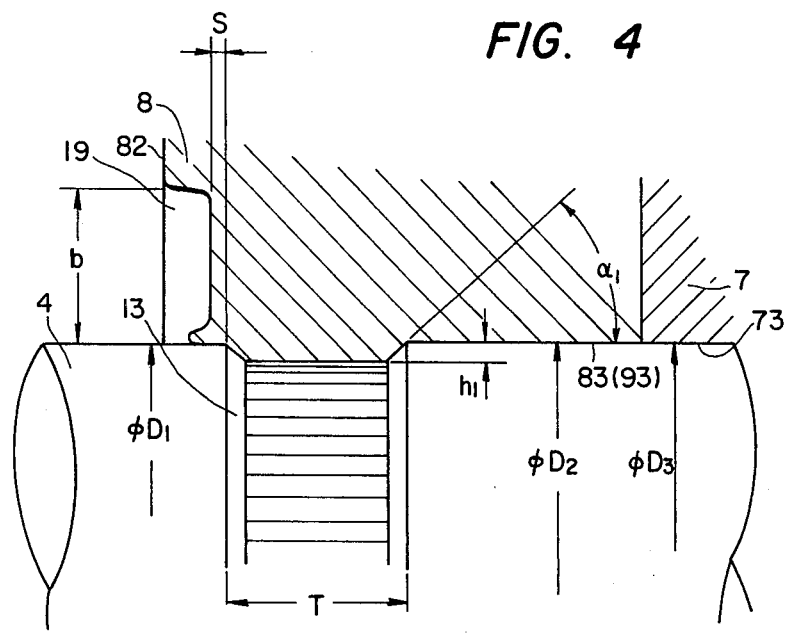
FIG. 4 is a diagram illustrating the details of the coupling portion of FIG. 2.
Figure 5:
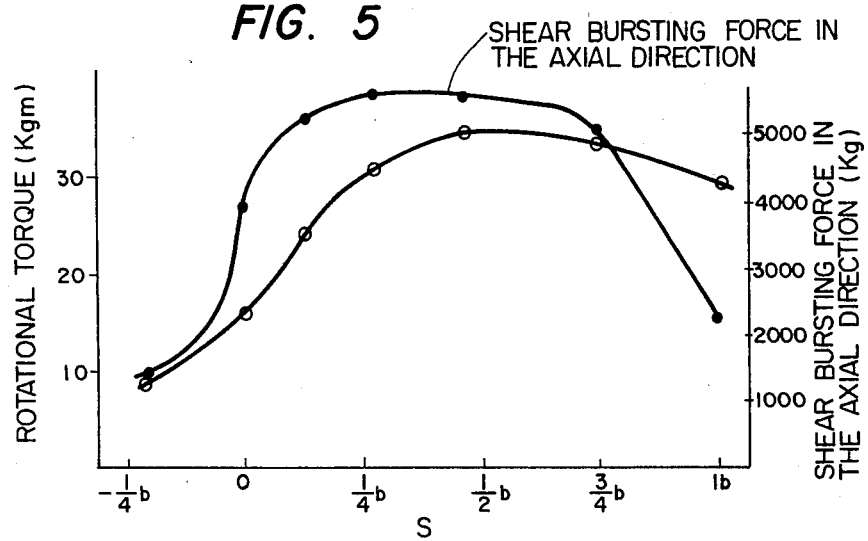
FIG. 5 is a diagram showing a relation between elements s, be that are related to positions of grooves and the like and the coupling strength (rotational torque, shear bursting force in the axial direction)

According to the coupling method of the embodiment of the present invention, the rotor cores 8, 9 are allowed to flow into the whole grooves 13, 14 as shown in FIG. 4, enabling the shear bursting force in the axial direction to be increased.

Table 1 shows experimental results of the coupling method of the present invention shown in FIGS. 1 and 2, and the coupling methods shown in FIGS. 10 and 11 (diameter of the rotary shaft 4 is $D_1 = 17$ mm).

TABLE 1

| Item | Coupling method | | |
|---|---|---|---|
| | (A) Present invention | (B) Conventional example (FIG. 11) | (C) Conventional example (FIG. 10) |
| (1) Force for introducing rotary shaft | 0–0.1 ton | 3.5–4.5 tons | 4.0–5.0 tons |
| (2) Shear bursting force in the axial direction | 13–18 tons | 8–11 tons | 3.5–4.5 tons |
| (3) Bending of rotary shaft | 0.01–0.03 mm | 0.03–0.12 mm | 0.03–0.12 mm |
| (4) Rotational torque of rotor core | 35–40 kg · m | 8–12 kg · m | 15–20 kg · m |

According to the coupling method of the embodiment of the present invention by which the rotor cores are coupled to the rotary shaft with the preload being exerted on the yoke and the rotor cores, the force in the axial directions remains in the contacting surfaces among the yoke and rotor cores even after they have been coupled. The residual force in the axial direction reaches 6 to 8 tons when the rotary shaft 4 has a diameter of 17 mm and the yoke has an outer diameter of 42 mm. On the other hand, according to the conventional method shown in FIG. 10, the residual force in the axial direction is as small as 0 to 0.5 ton, and according to the conventional method shown in FIG. 11, the residual force is as small as about 0.5 to 1.5 tons. Thus, with the coupling method of the present invention, great force resides in the axial direction enabling the contacting surfaces among the rotor cores and yoke to be very intimately adhered together. Consequently, electric output is increased with the reduction in reluctance, and noise by magnetism is reduced.

Figure 13:
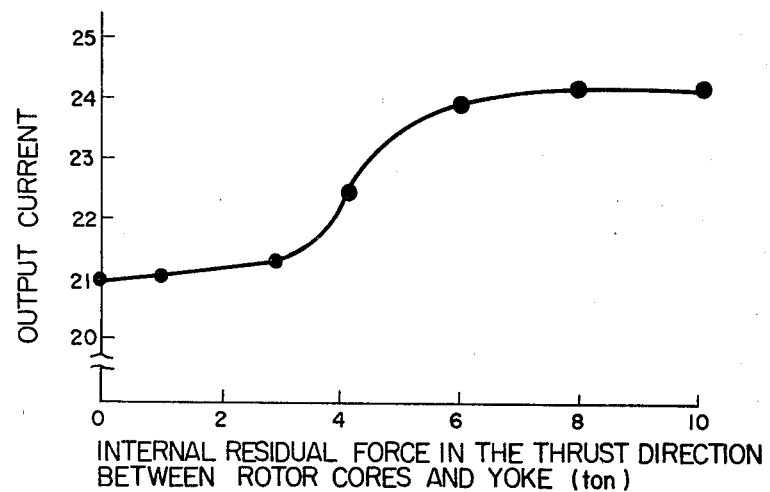
FIG. 13 is a diagram showing a relation between the output current and the internal residual force in the thrust direction between the rotor cores and yoke, to illustrate one of the effects obtained by the coupling method of the present invention.
Figure 14:
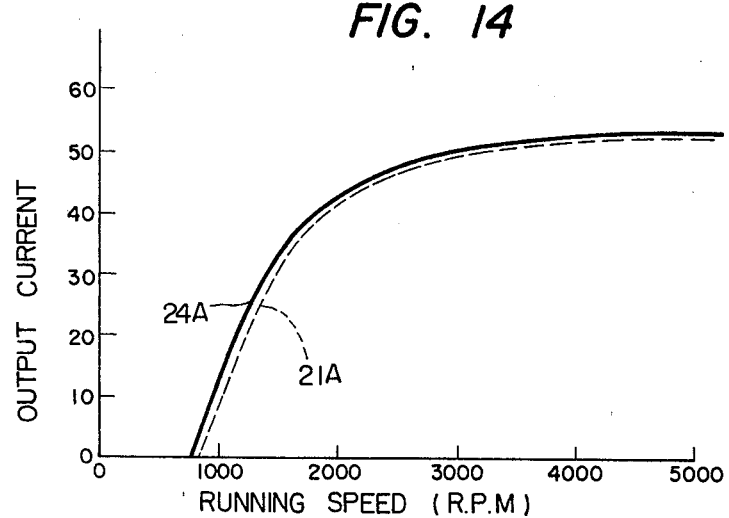
FIG. 14 illustrates a relation between the running speed and the output current, which indicates that the output current is increased over a range of whole running speeds owing to the increase in the internal residual force illustrated in FIG. 13.

FIG. 13 illustrates a relation between the output current and the internal force in the axial direction which resides among the rotor cores and yoke. A machine tested is of the type shown in FIG. 1, and is rated at 5000 rpm, 50 A. Under the conditions of a running speed of 1250 rpm and a voltage of 14 V, the output current is 21 A when the internal residual force is smaller than about 3 tons, and the output current increases to 24 A when the internal residual force exceeds 6 tons. Namely, the output current increases by 14% simply by changing the coupling method. This relation holds true for all the running range of automobile engines, as shown in FIG. 14. That is to say, by employing the coupling method of the present invention, the electric output increases by more than 10% as indicated by a solid line as compared with the conventional systems indicated by a broken line.

Figure 15:
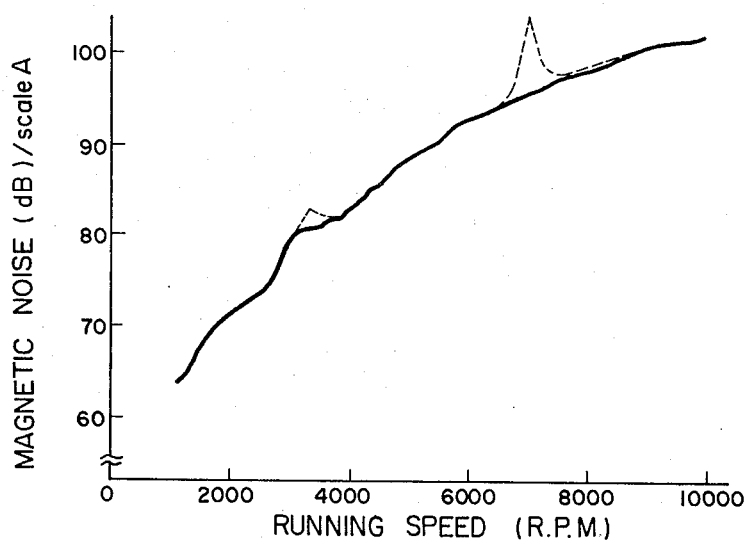
FIG. 15 illustrates a relation between the running speed and the magnetic noise, which varies depending upon the coupling methods.
Figure 16:
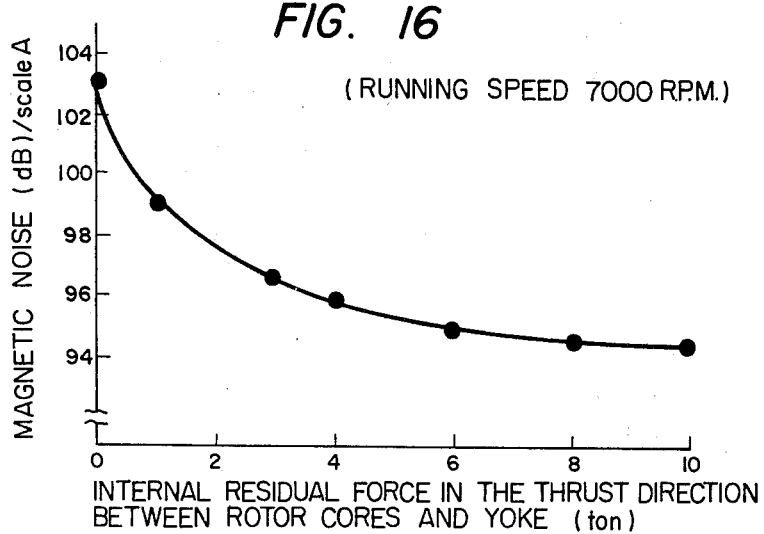
FIG. 16 illustrates a relation between the magnetic noise and the internal residual force among the rotor cores and yoke, which varies depending upon the coupling methods.

The relation between the running speed of the above-mentioned generator and magnetic noise is as shown in FIG. 15. A broken line indicates a noise level when the conventional coupling method shown in FIG. 10 is employed; the noise reaches peak values (103 dB) in the vicinities of 3300 rpm and 7000 rpm. With the coupling method of the present invention, however, such peak values do not appear (95 dB at 7000 rpm) as indicated by a solid line. This is due to the fact that the magnetic noise reduces with the increase in the degree of intimately contacted state among the rotor cores and yoke, as illustrated in FIG. 16. According to the coupling method of the present invention, the noise can be reduced by about 8 dB (8%) at about 7000 rpm.

Figure 17:
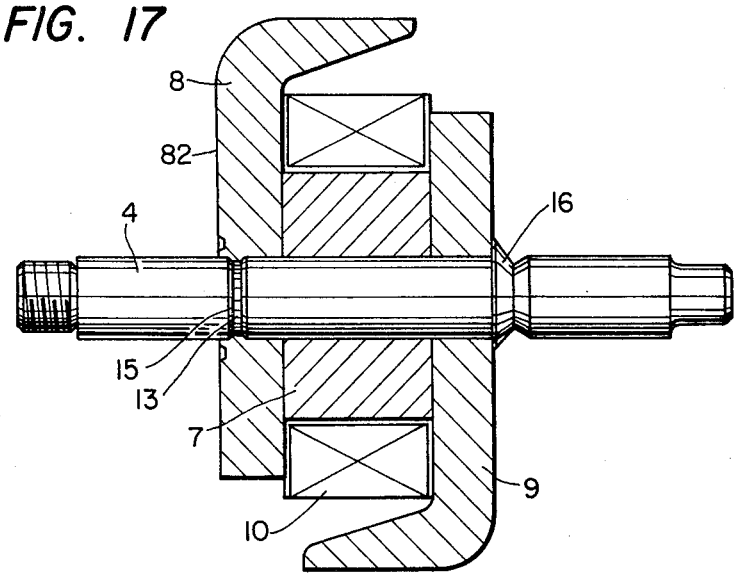
FIGS. 17 and 18 are cross-sectional view showing rotors according to further embodiments of the present invention.

FIG. 17 illustrates another embodiment of the present invention.

According to this embodiment, a flange 16 is formed on a portion of the rotary shaft 4, and yoke 7 and rotor cores 8, 9 are fitted to the rotary shaft 4, preload is exerted on the rotor cores from their outer sides, and an end portion 82 of the rotor core 8 is pressed so that it plastically flows into the groove 13. This embodiment is also capable of preventing the rotor shaft from being bent during the coupling. Further, a great residual force oriented in the axial direction develops in the contacting surfaces among the rotor cores and yoke as mentioned in the foregoing embodiment, enabling the electric output to be increased and the magnetic noise to be reduced.

Figure 18:
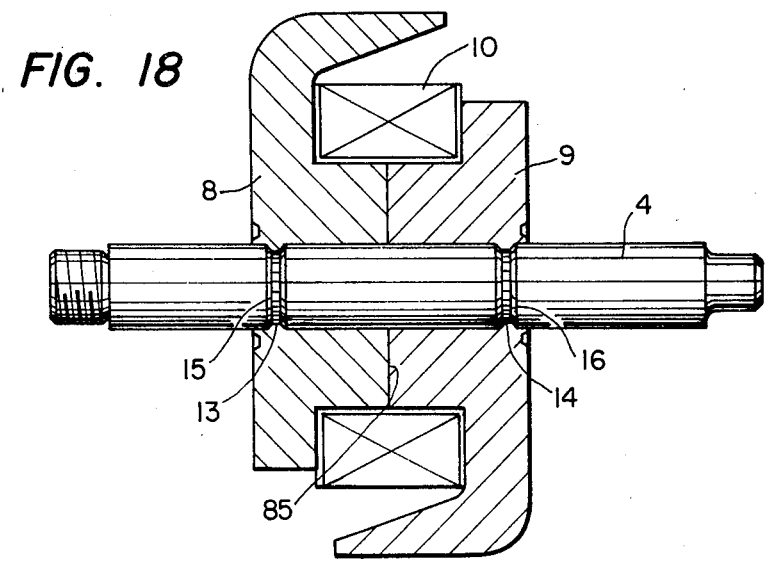

According to a further embodiment of the present invention illustrated in FIG. 18, the rotor consists of a pair of rotor cores 8, 9 which also serve as a yoke. The pair of rotor cores 8, 9 are mechanically firmly secured to the rotor shaft 4 by the same method as the embodiment of FIGS. 1 and 2. In this case, also, a great force oriented in the axial direction resides in a contacting surface 85 between the rotor cores 8 and 9 even after they have been coupled together, presenting excellent electric characteristics and reduced magnetic noise.

According to a still further embodiment of the present invention illustrated in FIG. 19, the rotor cores 8, 9 are so formed as to separate away from the yoke by an amount δ in the hollow portions 83, 93. Here, the amount δ should lie from 0.1 to 1.0 mm, and preferably from 0.2 to 0.8 mm.

Thus, by forming the rotor cores to separate away from the yoke by the amount δ, it is possible to further increase the degree of contacting state on the contacting surfaces 84, 94 between the yoke and rotor cores after they have been coupled together.

This embodiment is particularly effective when the rotor cores 8, 9 are made of a material having small deformation resistance. For instance, the rotor cores 8, 9 made of a low-carbon steel will be annealed to decrease the deformation resistance, so that magnetic characteristics are improved. If the preload is exerted on the rotor cores made of a material having small deformation resistance prior to the coupling operation, the outer portions of the rotor cores which have not yet been brought into contact with the yoke 7 undergo deformation, so that sufficient force is not exerted on the contacting surfaces between the rotor cores and the yoke 7.

With reference to FIG. 20, the yoke may be recessed by an amount, instead of protruding the rotor cores to separate away from the yoke.

The protruded surfaces or recessed surfaces will be formed by a plane which is tilted by a predetermined angle from a plane which is at right angles with the axial line. Or, the protruded surfaces and recessed surfaces may be formed on both the yoke and the rotor cores.

Or, the contacting surfaces 85 of both rotor cores may be tilted in placing the embodiment of FIG. 18 in practice.

Although the aforementioned embodiments have all dealt with the generators, the present invention can of course be applied to the similarly constructed motors.

Furthermore, the core member may be composed of rotor cores and yoke of shapes other than those of the aforementioned embodiments. However, among the members constituting the core member, those located near the end surfaces should be made of a material having a predetermined rigidity like the rotor cores as illustrated in the above-mentioned embodiments, or sufficient effects will not be obtained by the coupling under the application of preloading.

According to the present invention as mentioned above, the core member is secured to the rotor shaft, by forming annular grooves in the rotary shaft at positions slightly on the inner side of the end surfaces of the core member, by forming ruggid portions in the grooves, and by pressing end surfaces of the core member so that portions thereof are fitted into the grooves. Consequently, the rotor shaft and the core member are firmly coupled together, while preventing the rotary shaft from being bent during the step of coupling.

What is claimed is:

1. A method of fastening a rotor core for a rotary machine, comprising:
providing a rotary shaft having at least one annular groove in the circumference thereof;
inserting said rotary shaft into a shaft receiving hollow portion of a rotor core so as to position the annular groove at a position slightly on the inner side of an end surface of said rotary core; and
cold-pressing a portion of said end surface near the shaft receiving hollow portion of said rotary core while exerting a preload on the remaining portion of said end surface of said rotary core said preload subjecting said core member to a stress which is nearly equal to or slightly smaller than the deformation resistance thereof, said cold-pressing causing a portion of said rotary core to flow plastically into the groove of said rotary shaft, thereby to fasten the core and the rotary shaft together.

2. A method of fastening a rotor core for a rotary machine to a rotary shaft as claimed in claim 1, wherein two annular grooves are formed on the annular surface of said rotary shaft.

3. A method of fastening a rotor core for a rotary machine to a rotary shaft as claimed in claim 1, wherein the shaft receiving hollow portion has a diameter which is slightly greater than the diameter of said rotary shaft.

4. A method of fastening a rotor core for a rotary machine to a rotary shaft as claimed in claim 1, wherein a rugged bottom is formed on the bottom of the annular groove of said rotary shaft.

5. A method of fastening a rotor core for a rotary machine as claimed in claim 2, wherein said preload is exerted in the end surface of the core by supporting said core between a receiver and a holder which are biased together.

6. A method of fastening a rotor core for a rotary machine as claimed in claim 5, wherein said cold-pressing is performed by a pressing tool which is reciprocated through said receiver and holder coaxially about said shaft into engagement with a respective end surface of the core member.

7. A method of fastening a rotor core for a rotary machine, comprising:
providing a rotary shaft having at least one annular groove in the circumference thereof;
inserting said rotary shaft into a shaft receiving hollow portion of a rotor core so as to position the annular groove at a position slightly on the inner side of an end surface of said rotary core; and
cold-pressing a portion of said end surface near the shaft receiving hollow portion of said rotary core while exerting a preload on the remaining portion of said end of said rotary core in a manner causing a portion of said rotary core to flow plastically into the groove of said rotary shaft, thereby to fasten the core and the rotary shaft together,
wherein said step of the cold-pressing on the end surface of said rotary core is carried out so that a recessed portion formed in said end surface of the rotor core satisfies the following relationship relative to the annular groove: $0 \leq s/b \leq \frac{3}{4}$, wherein s denotes the distance from the bottom of the recessed portion on the end surface of said rotor core to the groove, and b denotes the width from the circumference of said rotary shaft to the outer circumferential end of the recessed portion.

* * * * *